US008313269B2

(12) United States Patent
Fisher et al.

(10) Patent No.: US 8,313,269 B2
(45) Date of Patent: Nov. 20, 2012

(54) PNEUMATIC PARTICULATE MATERIAL FILL SYSTEMS AND METHODS

(75) Inventors: Chad Adam Fisher, Duncan, OK (US); Calvin Lynn Stegemoeller, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 402 days.

(21) Appl. No.: 12/716,422

(22) Filed: Mar. 3, 2010

(65) Prior Publication Data

US 2011/0217129 A1 Sep. 8, 2011

(51) Int. Cl.
*B65G 53/60* (2006.01)

(52) U.S. Cl. ............. 406/173; 409/53; 409/54; 409/55; 409/197; 409/198; 222/413

(58) Field of Classification Search .................... 406/53, 406/54, 55, 173, 197, 198; 222/413
See application file for complete search history.

(56) References Cited

U.S. PATENT DOCUMENTS

| | | | |
|---|---|---|---|
| 3,212,197 A | 10/1965 | Crawford | 34/371 |
| 3,392,831 A | 7/1968 | Eckardt | 209/81 |
| 3,777,405 A | 12/1973 | Crawford | 34/57 |
| 4,179,265 A * | 12/1979 | Gildersleeve | 432/36 |
| 4,328,913 A | 5/1982 | Whiteman | 222/413 |
| 4,499,669 A | 2/1985 | Haeck | 34/102 |
| 4,588,559 A * | 5/1986 | Emmett | 422/162 |
| 4,802,141 A | 1/1989 | Stegemoeller | 366/132 |
| 4,955,550 A * | 9/1990 | Satake et al. | 241/101.4 |
| 4,973,203 A * | 11/1990 | Oftedal | 406/152 |
| 5,035,543 A * | 7/1991 | Medemblik et al. | 406/39 |
| 5,070,624 A * | 12/1991 | Vero et al. | 34/429 |
| 5,156,099 A * | 10/1992 | Ohshita et al. | 110/245 |
| 5,190,374 A | 3/1993 | Harms | 366/165 |
| 5,382,411 A | 1/1995 | Allen | 422/131 |
| 5,562,832 A * | 10/1996 | McOnie et al. | 210/710 |
| 6,368,028 B1 * | 4/2002 | Nester | 406/109 |
| 6,620,243 B1 * | 9/2003 | Bertellotti et al. | 118/621 |
| 6,948,535 B2 | 9/2005 | Stegemoeller | 141/67 |
| 7,104,328 B2 | 9/2006 | Phillippi | 166/308.5 |
| 7,703,518 B2 * | 4/2010 | Phillippi et al. | 166/267 |
| 7,926,564 B2 * | 4/2011 | Phillippi et al. | 166/267 |
| 2006/0088455 A1 * | 4/2006 | Jones | 422/198 |
| 2008/0277121 A1 | 11/2008 | Phillippi | |
| 2010/0281767 A1 * | 11/2010 | Zeeck | 44/589 |
| 2011/0217129 A1 * | 9/2011 | Fisher et al. | 406/53 |
| 2012/0107472 A1 * | 5/2012 | Zeeck | 426/442 |

FOREIGN PATENT DOCUMENTS

GB 1015346 12/1965

* cited by examiner

*Primary Examiner* — Joseph A Dillon, Jr.
(74) *Attorney, Agent, or Firm* — John W. Wustenberg; Baker Botts LLP

(57) ABSTRACT

Pneumatic particulate material fill systems and methods are disclosed. A particulate material fill system includes a cyclone separator having an inlet adapted to receive pneumatically conveyed particulate material. The cyclone separator has a first outlet adapted to vent air and a second outlet adapted to discharge solids. The particulate material fill system includes a tank adapted to receive solids discharged from the cyclone separator via the second outlet. The tank is adapted for use at atmospheric pressure.

16 Claims, 2 Drawing Sheets

PNEUMATIC PARTICULATE MATERIAL FILL SYSTEMS AND METHODS

BACKGROUND

The present invention relates generally to transferring materials for well operations, and more particularly, to pneumatic particulate material fill systems and methods.

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material must be transferred or conveyed from the tank truck into a supply tank for metering into a mixer as needed. The dry powder materials are usually transferred from the tank truck pneumatically. In the pneumatic conveying process, the air used for conveying must be vented from the storage tank and typically carries an undesirable amount of dust with it.

Cyclone separators are typically used to separate the dust from the vented air. However, cyclone separators which are small enough to be included with a portable mixing system have a limited capacity for storing solids separated from the air. When the dust collection container is filled, the collected dust may fill or clog the cyclone separator and dust is undesirably vented with what should be clean air or substantially clean air. To prevent undesirable dust discharge, the system must be stopped while the collection container is emptied.

Some fill system designs use a pressurized storage tank. In such systems, a pressurized air stream blows air and powder into the storage tank. The powder falls out of the pressurized air stream as the velocity drops with entry into the tank and while the air stream passes through a cyclone separator. The tank must be designed for pneumatic service with pressure relief and rupture elements to prevent overpressurization. Tanks commonly employ a metering feeder. While filling the tank during the operation of the metering feeder, the metering factor for the output of the feeder may change due to the vessel being pressurized. Thus, the accuracy and repeatability of the metering feeder is impacted by the pressurization.

Some fill system designs mount a cyclone separator and collection container above a storage tank to allow powder to fall from the separator to the tank. In such systems, the overall height of the assembly includes the height of the separator and collection container plus that of the storage tank. The height requirements of such designs are undesirable.

FIGURES

Some specific exemplary embodiments of the disclosure may be understood by referring, in part, to the following description and the accompanying drawings.

Figure 1:
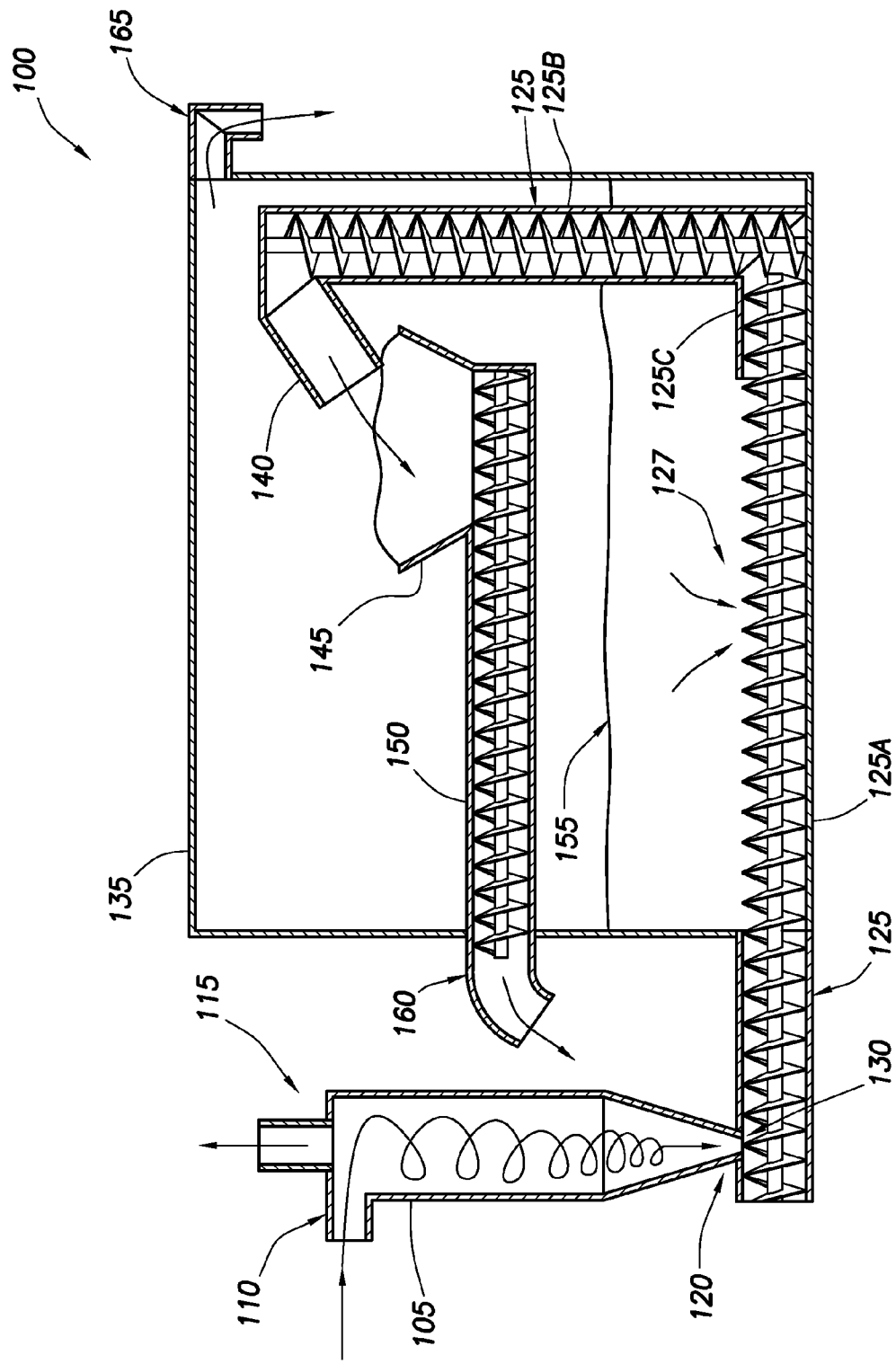
FIG. 1 is a schematic diagram of a pneumatic particulate material fill system in accordance with an exemplary embodiment of the present invention.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present disclosure relates generally to transferring materials for well operations, and more particularly, to pneumatic particulate material fill systems and methods.

In one aspect, a pneumatic particulate material fill system is disclosed. A particulate material fill system includes a cyclone separator having an inlet adapted to receive pneumatically conveyed particulate material. The cyclone separator has a first outlet adapted to vent air and a second outlet adapted to discharge solids. The particulate material fill system includes a tank adapted to receive solids discharged from the cyclone separator via the second outlet. The tank is adapted for use at atmospheric pressure.

In another aspect, a method for accurately metering and conveying particulate material is disclosed. A stream of particulate material is pneumatically conveyed to a cyclone separator. Air from the stream is vented via a first outlet of the cyclone separator. Particulate material from the stream is discharged via a second outlet of the cyclone separator. The particulate material is transferred to a tank, where the tank is adapted for use at atmospheric pressure.

Accordingly, this disclosure provides improved pneumatic particulate material fill systems and methods allow use of bulk tank that need not be designed for a pressurized environment and therefore may be of smaller and/or lighter design as compared to conventional designs. The systems and methods disclosed herein require fewer components and are simpler to construct as compared to conventional designs. The need for a dust collection container is eliminated, thereby eliminating the need to stop operations while a dust collection container is emptied. In addition, safety is increased by eliminating the need for a pressurized bulk tank. Further, metering and storage devices may be filled without pressurization affecting the metering factors, and while a cyclone separator is operating. Systems according to this disclosure may also provide an arrangement of cyclone separator and auger that allows for a shorter overall height. Moreover, reliability may be improved by reducing the number of components and improving access. These and other features and advantages of the present disclosure will be readily apparent to those skilled in the art upon a reading of the description of exemplary embodiments, which follows.

DESCRIPTION

The present invention relates generally to transferring materials for well operations, and more particularly, to pneumatic particulate material fill systems and methods.

The disclosed systems and methods relate to the transfer of particulate materials (e.g., cement or dry gel materials) used for various well treatments. The particulate materials are typically supplied in the form of dry powder and/or granular material, and usually comprise a mixture of various particle sizes. The particles are generally small enough to be pneumatically conveyed through pipes and hoses. The smallest particles may be referred to as dust or powder. The term particulate material is used herein to refer to any conventional dry well treating material that may be pneumatically conveyed. As those of ordinary skill in the art will recognize, the particulate material may be any material and used in any application requiring one or more material components in a form such as a dry powder or granular form.

FIG. 1 shows a cross-sectional diagram of a particulate material fill and feeder system 100 in accordance with an exemplary embodiment of the present disclosure. In certain embodiments, the system 100 may be part of a portable (e.g., a skid- or truck-mounted) treating fluid mixing system and thus may be limited in size and the amount of particulate material it can hold. The system 100 may be provided at a well site for storing and/or supplying particulate material. The particulate material may be transported to a drilling site in a tank truck. Other bulk storage means are also used at well sites. The dry treating material may be temporarily transferred from tanker trucks into fixed storage containers erected at a well site. For offshore operations, the dry treating materials may be delivered by and stored in a barge until needed, or may be transferred from a barge into a bulk storage tank on a drill ship or platform.

The system 100 includes a cyclone separator 105 having an inlet 110, a first outlet 115 and a second outlet 120. The cyclone separator 105 may receive a pneumatically conveyed stream of particulate material via inlet 110. Before a treatment begins or during a treatment process, a quantity of particulate material may be transferred to the cyclone separator 105. Such transfer may be normally made by a pneumatic conveying system which fluidizes the material with a flow of air. A pump (not shown) and/or a source of pressurized air may be adapted to supply the air flow for the pneumatically conveyed stream. Pneumatic conveying systems are typically built into tank trucks used to ship dry powdered or granular materials and/or trucks used to ship dry powdered or granular materials and/or built into free standing bulk storage tanks. The fluidized material may flow through a pipe, hose, or other conduit to the cyclone separator 105.

After the stream of particulate material flows through the inlet 110, the separator 105 may separate solids from the air. Air, which may be clean or substantially clean, air may be vented from the top of the separator 105 via outlet 115. Separated solids may drop toward the bottom of separator 105.

A conveyor 125 having an inlet 130 may be adapted to receive particulate material from the second outlet 120 of the cyclone separator 105. The conveyor 125 may be coupled to, and adapted to transfer the particulate material to, a tank 135. FIG. 1 depicts the second outlet 120 coupled to a portion of the conveyor 125 that extends beyond the sidewall of the tank 135. However, in alternative embodiments, the cyclone separator 105 may be adapted to directly transfer particulate material to the tank 135. For example, the second outlet 120 may be coupled to an inlet in the tank sidewall via a chute.

The conveyor 125 may include horizontal section 125A and vertical section 125B. The horizontal section 125A may be attached at the base of the tank 135. The vertical section 125B may include a chute 140 for directing the particulate material into a hopper 145, described in more detail below.

In certain embodiments, the conveyor sections 125A, 125B may include, but not be limited to, an auger, screw feeder, screw conveyor, screw elevator, or another device which may be used to transfer material. For example, the conveyor section 125B may alternatively include a bucket conveyor and belt loop mechanism adapted for use with the tank 135, as would be understood by one of ordinary skill in the art having the benefit of this disclosure. Additionally, while the conveyor sections 125A, 125B are respectively shown in FIG. 1 as disposed in horizontal and vertical orientations, the sections may be disposed in any of a number of different orientations.

The conveyor 125 may be particularly well adapted for supplying granular material, which may not convey well due to its granular characteristics. For example, particulate material may have a tendency to slide when conveyed, especially when conveyed along an incline or in a vertical direction. Thus, the conveyor section 125A may be configured to transfer material to the conveyor section 125B with sufficient force to avoid material back-up due to any tendency a material may have to resist elevation and slide down the conveyor section 125B.

In certain embodiments, the conveyor 125 is an enclosed and sealed structure such that the material being transported by the conveyor 125 is not exposed to the outside environment. This may be accomplished by forming the conveyor 125 with an outer housing that surrounds augers or other conveying mechanisms and sealing the areas where the conveyor attaches to the tank 135 with elastomeric O-rings, brazing or other similar means. Alternatively, the outer housing of the conveyor 125 may be integrally formed with the housing of the tank 135.

As those of ordinary skill in the art will appreciate, alternate ways of enclosing and sealing the conveyor 125 may be employed. Those of ordinary skill in the art will also appreciate that certain objectives of the present disclosure may be substantially met even if the conveyor 125 is not completely enclosed and sealed. Furthermore, those of ordinary skill in the art will also recognize that the conveyor 125 may be any known volumetric or mass conveyor system.

The conveyor section 125A may include an opening 127 through the section 125A may interface with particulate material in tank 135. The section 125A may be adapted to draw particulate material from the base of the tank 135 and convey it to the section 125B, as shown in the figure. Because particulate material may be drawn from the bottom of the tank 135, it may have a tendency to densify due to compacting. The rotational movement of the conveyor section 125A, however, may effectively break up clumps of material and thereby at least mitigate the tendency to densify, if not eliminating densification. A shroud 125C extending over or about a length of the section 125A may be arranged to aid the transfer of material between sections 125 and 125B. Alternatively, a junction box may be used.

The tank 135 need not be designed for a pressurized environment and therefore may be smaller and/or lighter than pressurized tank systems. The tank 135 may include an outlet 165 for venting air from the tank interior to the surrounding environment. Because the tank 135 is not pressurized, its design may be simpler and require fewer components as compared to pressurized tank systems.

The tank 135 may include a metering system for providing a controlled, i.e., metered, flow of particulate material at an outlet 160. A supply tank with a metered output used in a well treating fluid system like that of the present embodiments is shown in U.S. Pat. No. 6,948,535, which is incorporated herein by reference in its entirety. Particulate material may pass from the outlet 160 to a mixer (not shown). Thereafter, additives may be combined with the particulate material, as desired. For example, the particulate material may be mixed with water and a gel, cement slurry, or other treating fluid may be produced for treating a well (e.g., a hydrocarbon recovery well).

The hopper 145 may be essentially an open container, which temporarily collects particulate material and feeds particulate material to a metering feeder 150. The hopper 145 may be mounted in an upper portion of the tank 135. The hopper 145 may be mounted above the fill line 155 of the particulate material in the tank and may be near the top of the tank 135. The hopper 145 may be open on the top to receive the particulate material ejected from the chute 140.

The metering feeder 150 may be provided for metering the particulate material out of the tank 135. In certain embodiments, the metering feeder 150 may be a high tolerance screw feeder capable of metering precise volumes of particulate material. The metering feeder 150 may be attached to the base of the hopper 145. As can be seen from the figure, metering feeder 150 may be partially disposed inside and outside of the tank 135. Like conveyor 125, metering feeder 150 may be enclosed and sealed. Metering feeder 150 may include a chute (not shown), which operates to discharge the particulate material from the tank 135. In certain embodiments, the metering feeder 150 may discharge the particulate material into a mixing blender for further processing.

Accordingly, the particulate material may be in a powder or granular state when it is fed into the metering feeder 150, and the hopper 145 may be consistently kept full so that a constant volume of material may be drawn by the metering feeder 150. Because the interior environment of the tank 135 is not pressurized, the metering rates of the metering feeder 150 are not affected by an internal pressure of the tank 135. Consequently, the system 100 may be capable of delivering the particulate material out of the tank 135 at a substantially uniform density and rate.

The conveyor 125 may be designed and operated to convey the particulate material to the hopper 145 at a bulk rate that exceeds the maximum rate at which the metering feeder 150 may be capable of transporting the material out of the tank 135. Because the hopper 150 is located above the fill line 155 of the particulate material in the tank, the overflow of the material being delivered to the hopper 150 by the conveyor 125 may spill back into the tank 135. Therefore, the hopper 150 may continuously overfill and spill over during operation of the system. The excess particulate material may then be recycled back to the conveying system while the hopper 150 remains at a consistent material level and density.

Figure 2:
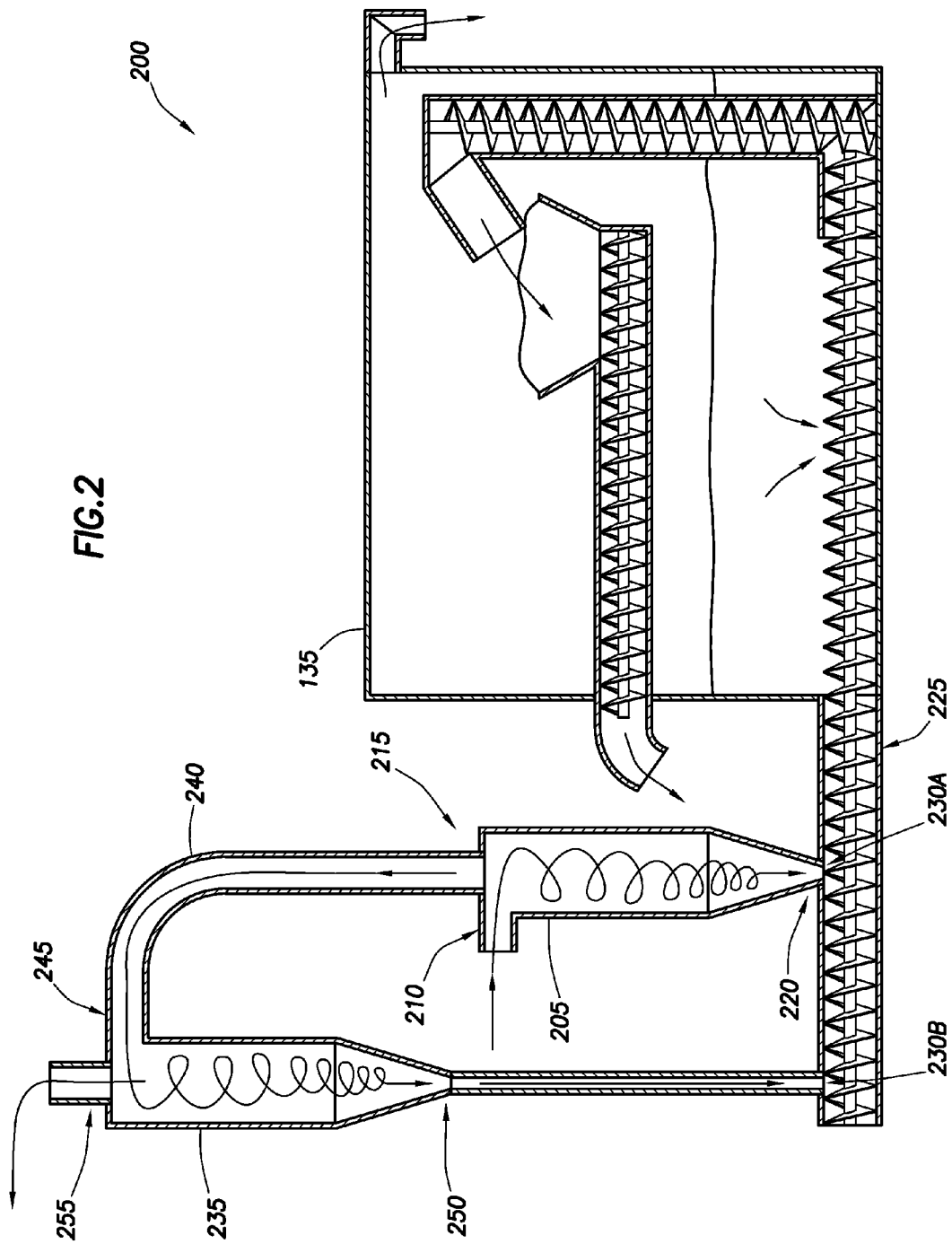
FIG. 2 is a schematic diagram of a pneumatic particulate material fill system with a multi-stage cyclone separator feature, in accordance with an exemplary embodiment of the present disclosure.

FIG. 2 shows a cross-sectional diagram of a particulate material fill and feeder system 200 with a multi-stage cyclone separator feature, in accordance with an exemplary embodiment of the present disclosure. Similar to the system 100, the system 200 may include a cyclone separator 205 having an inlet 210, a first outlet 215 and a second outlet 220, and may be coupled to a conveyor 225. The cyclone separator 205 may receive a pneumatically conveyed stream of particulate material via inlet 210 and may separate solids from the air. Separated solids may drop toward the bottom of separator 205, through the second outlet 220 and toward an inlet 230A of a conveyor 225. An air stream may be vented through the top of the separator 205 via the first outlet 215. The air stream may or may not be clean at the point of discharge through the first outlet 215. For example, the air stream may yet be dust-laden to an undesirable extent, even though a significant amount of solids may have been separated from the air. To further separate solids from the air stream, the air stream may be routed from the first outlet 215 to a secondary cyclone separator 235, which may be coupled to the cyclone separator 205 via connection 240.

The secondary cyclone separator 235 may receive the air stream via an inlet 245 and further separate solids from the air stream. The solids may be directed toward a second outlet 250 near the bottom of the separator 235. The separator 235 may be coupled to the conveyor 225 so that the separated solids may be transferred to the conveyor inlet 230B. The remaining air stream may be vented from the secondary separator 235 via a first outlet 255. Accordingly, a two-stage separator configuration may provide for an additional level of solid separation, thereby capturing more solids and venting cleaner air.

In certain embodiments, the secondary cyclone separator 235 may be at least substantially similar to the separator 205. In certain embodiments, the secondary cyclone separator 235 may be smaller in size, capacity, and/or other ratings. The separators may be connected by any means suitable for routing the air stream, such as piping, tubing, duct, etc. The separators may be directly coupled to the conveyor 225 or may be intermediately coupled to the conveyor 225 via any means suitable for transferring solids. Although two stages are depicted, it should be understood that any number of cyclone separator stages may be employed, as desired, to achieve design goals.

Accordingly, this disclosure provides for improved pneumatic particulate material fill systems and methods allow use of bulk tank that need not be designed for a pressurized environment and therefore may be of smaller and/or lighter design as compared to conventional designs. The systems and methods disclosed herein require fewer components and are simpler to construct as compared to conventional designs. The need for a dust collection container is eliminated, thereby eliminating the need to stop operations while a dust collection container is emptied. In addition, safety is increased by eliminating the need for a pressurized bulk tank. Further, metering and storage devices may be filled without pressurization affecting the metering factors, and while a cyclone separator is operating. Systems according to this disclosure may also provide an arrangement of cyclone separator and auger that allows for a shorter overall height. Moreover, reliability may be improved by reducing the number of components and improving access. The features and advantages of the present disclosure will be readily apparent to those skilled in the art upon a reading of the description of exemplary embodiments, which follows.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The indefinite articles "a" or "an", as used in the claims, are defined herein to mean one or more than one of the element that it introduces. The terms in the claims have their plain, ordinary meaning unless otherwise explicitly and clearly defined by the patentee.

What is claimed is:

1. A pneumatic particulate material fill system comprising:
a cyclone separator having an inlet adapted to receive pneumatically conveyed particulate material, where the cyclone separator has a first outlet adapted to vent air and a second outlet adapted to discharge solids; and
a tank adapted to receive solids discharged from the cyclone separator via the second outlet, wherein the tank is adapted for use at atmospheric pressure;
a conveyor having an inlet adapted to receive solids from the second outlet of the cyclone separator, and having an outlet adapted to discharge particulate material inside the tank;
a receptacle disposed inside of the tank; and
a metering feeder disposed at least partially within the tank and adapted to deliver particulate material from the receptacle at a substantially uniform rate.

2. The system of claim 1, wherein the conveyor comprises a first section disposed at the bottom of the tank, wherein the first section is configured to draw particulate material from the tank.

3. The system of claim 2, wherein the conveyor further comprises a second section, wherein the second section is configured to elevate particulate material received from the first section to the receptacle.

4. The system of claim 3, wherein one or both of the first section and the second section comprise a screw feed.

5. The system of claim 3, wherein one or both of the first section and the second section are disposed at least partially within the tank.

6. The system of claim 3, wherein the vertical section further comprises a chute adapted to direct particulate material into the receptacle.

7. The system of claim 1, wherein the system is transportable as a single unit.

8. The system of claim 1, wherein the receptacle has an open top adapted to allow particulate material to overflow into the tank.

9. The system of claim 3, further comprising:
a second cyclone separator coupled to the cyclone separator, wherein the second cyclone separator is adapted to receive air vented by the first outlet.

10. The system of claim 3, wherein an axis of the first section is substantially horizontal, and an axis of the second section is substantially vertical.

11. A method for accurately metering and conveying particulate material, the method comprising:
pneumatically conveying a stream of particulate material to a cyclone separator;
venting air from the stream via a first outlet of the cyclone separator;
discharging particulate material from the stream via a second outlet of the cyclone separator; and
transferring the particulate material to a tank with a conveyor, wherein the tank is adapted for use at atmospheric pressure; and
supplying a metering conveyor with the particulate material, wherein the metering conveyor is disposed at least partially within the tank.

12. The method of claim 11, wherein transferring step comprises:
transferring the particulate material in a substantially horizontal direction and then transferring the particulate material in a substantially vertical direction.

13. The method of claim 11, wherein the conveyor comprises a first section disposed at the bottom of the tank, the method further comprising:
drawing particulate material from the tank with the first section.

14. The method of claim 13, wherein the conveyor comprises a second section coupled to the first section, the method further comprising:
elevating the particulate material from the first section to an upper portion of the tank.

15. The method of claim 11, further comprising:
delivering the particulate material from the tank at a substantially uniform rate.

16. The method of claim 11, further comprising:
supplying the metering conveyor with the particulate material at a rate exceeding the substantially uniform rate.

* * * * *